INVENTOR
Joseph C. Thornwall

BY Stevens, Davis, Miller & Mosher [signature]
Earl Levy [signature]

ATTORNEYS

INVENTOR
Joseph C. Thornwall

BY Ostrow & Cary
Earl Levy
ATTORNEYS

United States Patent Office 3,501,752
Patented Mar. 17, 1970

3,501,752

PULSE-TYPE MAGNETIC CORE MEMORY ELEMENT CIRCUIT WITH BLOCKING OSCILLATOR FEEDBACK

Joseph C. Thornwall, 7006 Dolphin Road, Lanham, Md. 20801

Filed Jan. 13, 1966, Ser. No. 520,838
Int. Cl. G11b *5/00*
U.S. Cl. 340—174 7 Claims

ABSTRACT OF THE DISCLOSURE

A magnetic core memory element circuit includes a magnetic core memory element having a plurality of input windings and an output winding, a blocking oscillator connected between the output winding and one of the plurality of input windings, and a utilization device coupled to the blocking oscillator to receive an output therefrom. With this particular circuit configuration, the output from the magnetic core memory element can be applied to the utilization device and simultaneously be coupled back to the magnetic core memory element to automatically reset it to its original state, i.e., the magnetic core memory element can be interrogated without subsequent loss of information content.

The invention described herein was made by an employee of the United States Government and may be manufactured and used by or for the Government for governmental purposes without the payment of royalties thereon or therefor.

This invention relates to a magnetic core memory element circuit, and, more particularly, to a magnetic core memory element circuit that can be interrogated without subsequent loss of stored digital information.

One of the essential functions of digital processing equipment is the storage of digital information, which usually takes place in some form of a storage memory element circuit. The memory element itself may be any one of a number of two state devices wherein the two states thereof correspond to binary "1" and "0." One of the most reliable memory elements, because of its passive nature, is a magnetic core memory element.

The magnetic core memory element is especially suitable for use in digital processing equipment since its various windings allow for sufficient control of the outputs therefrom. There are usually three input windings—a first used to disable or set the core, a second used to enable or reset the core, and a third used to read or interrogate the information stored in the core. Prior art memory elements of this type have suffered by the fact that they either have had the inherent disadvantage of losing the digital information stored therein, after the read pulse is applied to the read winding thereof, or have required complicated circuits to restore the digital information which would otherwise be lost. In addition, prior art memory elements have suffered from the presence of undesirable noise voltage pulses being coupled to the utilization circuit.

It is therefore the principal object of this invention to provide a magnetic core memory element circuit which can be interrogated without subsequent loss of digital information.

It is another object of this invention to provide a magnetic core memory element circuit that requires very low power in digital equipment operating at low duty cycles.

It is a further object of this invention to provide a magnetic core memory element circuit simple in design, small in size, low in cost and high in operational efficiency and reliability.

It is still another object of this invention to provide a magnetic core memory element circuit capable of producing pulses which are free of any undesirable noise pulse voltages that are inherent in the switching of magnetic core memory elements.

It is still a further object of this invention to provide a magnetic core memory element circuit requiring only uni-directional pulses for the control thereof.

It is an additional object of this invention to provide a magnetic core memory element circuit wherein there are no stringent requirements on the magnitude and width of the read input pulse to be used therewith.

In brief, the invention comprises a magnetic core memory element circuit for producing an output signal while, at the same time, retaining the stored digital information which, in prior art circuits, is normally lost in the production of an output signal. The magnetic core memory element circuit includes a magnetic core memory element having essentially four input windings—namely, an enable, disable, read and reset windings—and an output winding; and a feedback network, made up of a delay element, such as a blocking oscillator, and an amplifier, connected between the output winding and the input reset winding of the magnetic core memory element. Now, assuming that the magnetic core memory element is in the enable state, then the application of a read pulse to the read input winding results in an output signal being derived from the output winding of the magnetic core memory element. This output signal, after first being delayed by the blocking oscillator and amplified, is then fed back to an input reset winding of the magnetic core memory element to set the core thereof in the same state as it was before the arrival of the read pulse. An additional output signal can be derived from the magnetic core memory circuit for use by a utilization circuit during the delay interval or during the time the core of the magnetic core memory element is being restored to its original state.

Other objects and a fuller understanding of the present invention may be had by reference to the following detailed description, and to the accompanying figures in the drawings.

Figure 1:
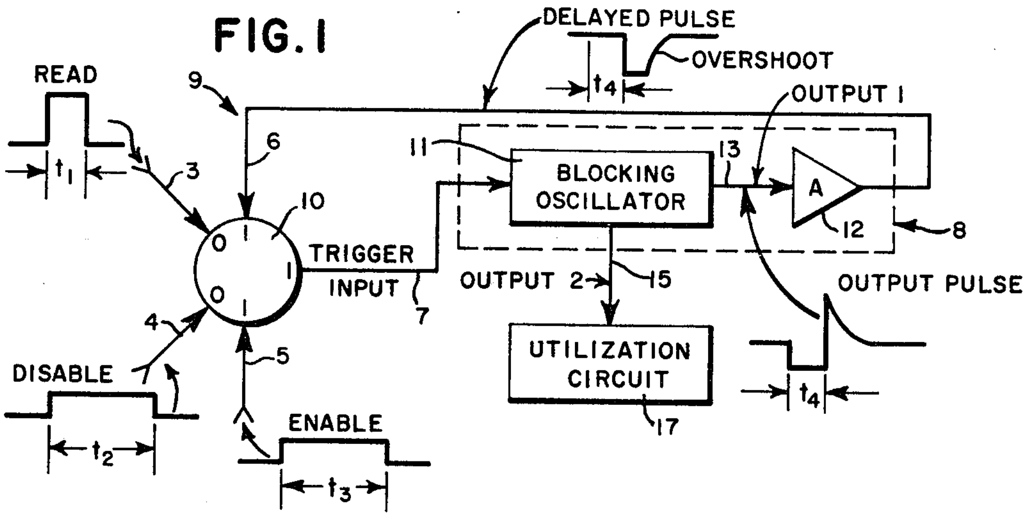
FIGURE 1 shows a preferred embodiment of the invention partially in schematic and partially in symbolic form.

Referring now to FIGURE 1, there is shown a magnetic core memory element circuit 9, comprising a magnetic core memory element 10 (shown in symbolic form) and a feedback network 8. The magnetic core memory element 10 essentially comprises a toroidal core with five windings, each being represented in FIGURE 1 by a terminal and winding phase designation (0 or 1). A fuller description of the symbol representing magnetic core memory element 10 can be found in the book entitled, "Digital Applications of Magnetic Devices" edited by Albert J. Myerhoff, (John J. Wiley & Sons, 1960), pp. 149, 150. The magnetic core memory element 10 is shown with four input windings—read, disable, enable and reset (feedback) having terminals 3, 4, 5 and 6, respectively—and an output winding (trigger input), as terminal 7. Feedback network 8 includes blocking oscillator 11 and amplifier 12 connected in series between output terminal 7 and input reset terminal 6 of magnetic core memory element 10.

In general, the magnetic core memory element 10 functions as follows: if it is enabled, the receipt of a read pulse at terminal 3 produces an output signal at terminal 7; and, on the other hand, if it is disabled, the receipt of a read pulse at terminal 3 will not produce an output signal at terminal 7.

In the present invention, in the case where the core of the magnetic core memory element 10 has been previously enabled and thereafter has a read pulse applied to read terminal 3, an output signal is developed at terminal 7, which is in turn applied to the blocking oscillator 11, connected to terminal 7, to trigger the blocking oscillator to produce a signal therefrom having an overshoot voltage (see FIGURE 1). An amplifier 12, connected to output 13 of blocking oscillator 11, amplifies and shapes the overshoot voltage of the signal from blocking oscillator 11 and feeds its output back to reset terminal 6 of magnetic core memory element 10 to reset the core to its enabled state. Now, on the other hand, where the core of the magnetic more memory element 10 is in its disabled state, blocking oscillator 11 will not be triggered, inasmuch as no output is developed at terminal 7 by the application of a read pulse to terminal 3.

Thus, it can be readily observed, by the operation of the invention, that stored digital information in magnetic core memory element 10 is retained by magnetic core memory element 10 being reset or not having the stored digital information removed therefrom in the first place, depending upon whether or not the core of the magnetic core memory element 10 is in an enabled or disabled state when a read signal is applied. Should it be desired that the read information be passed on to a utilization circuit, then output 15, from blocking oscillator 11 would be coupled to utilization circuit 17. In this manner, magnetic core memory element 10 can be read with its information being applied to a utilization circuit, without loss of the stored digital information therefrom.

As can be noted from the above description of the operation of magnetic core memory element circuit 9, there are essentially four pulses which must be taken into consideration. These pulses are shown in FIGURE 1 and include: the read pulse, the disable pulse, the enable pulse and the output pulse. There will now be presented the preferred relationship that these pulses should have with one another for magnetic core memory element circuit 9 to best perform in its intended manner.

It is essential that the width $t_1$ of the read pulse not be greater than the width $t_4$ of the output pulse, otherwise feedback circuit 8 might be prevented from resetting the core of the magnetic core memory element 10 to its original state. If this were not the case, then the read pulse would overlap into the overshoot interval of the output pulse and thereby prevent magnetic core memory element 10 from resetting, as desired, because of the fact that there would be two input signals, each of opposite polarity, being applied to magnetic core memory element 10 simultaneously.

The disable pulse should be chosen to have a combination of magnitude and width $t_2$ that will be sufficient to change the state of magnetic core memory element 10 without, at the same time, producing a pulse at terminal 7 of large enough amplitude to trigger blocking oscillator 11.

The enable pulse can have any combination of width and magnitude as long as it possesses sufficient energy to switch all of the flux in the core of the magnetic core memory element 10. This is due to the fact that any pulse appearing on output terminal 7 of magnetic core memory element 10, caused by the application of an enable pulse, will be of the wrong polarity to trigger blocking oscillator 11. Therefore, there will be no output from blocking oscillator 11 until a subsequent read pulse is applied to read input 3.

Figure 2:
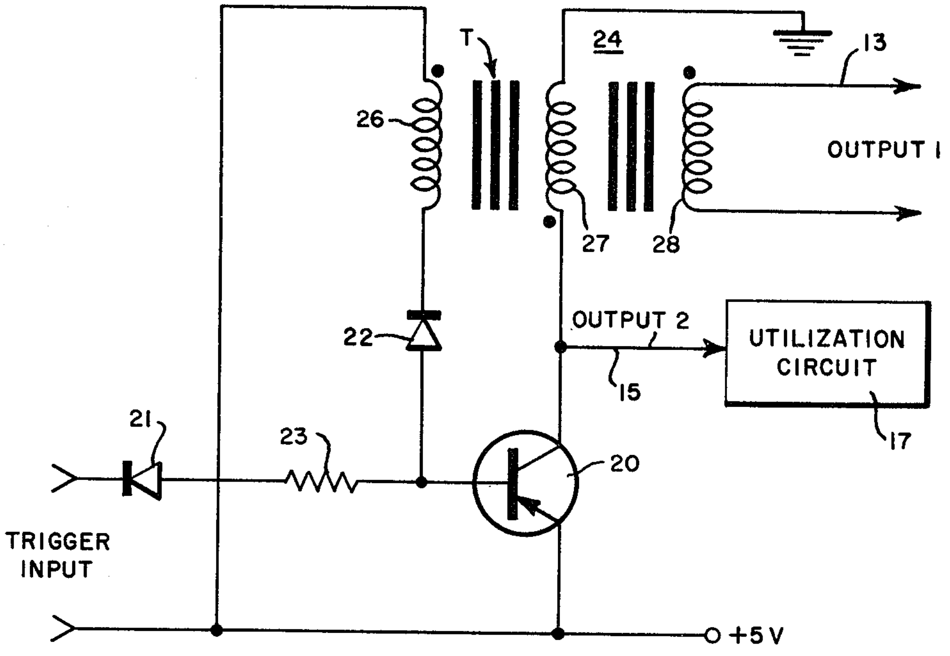
FIGURE 2 shows an example of one blocking oscillator circuit that can be used as part of the circuit in FIGURE 1.

In FIGURE 2, there is a more detailed showing of one example of a blocking oscillator that can be used as blocking oscillator 11 in the present invention. The output pulse from terminal 7 of magnetic core memory element 10 of FIGURE 1 is coupled through series connected diode 21 and resistor 23, to the base of transistor 20. The emitter of transistor 20 is connected to a plus +5 volt source. Between the base and emitter of transistor 20 is connected diode 22 in series with feedback winding 26 of transformer 24. Primary winding 27 of transformer 24 is connected between the collector of transistor 20 and ground; and output winding 28 of transformer 24 provides output 1 which is coupled to amplifier 12, as shown in FIGURE 1. Output 2 is taken from the collector af transisitor 20 and applied to utilization circuit 17.

Blocking oscillator circuit 11 operates as follows. Transistor 20 begins to conduct when a trigger voltage pulse of proper polarity and magnitude is applied to diode 21 from terminal 7 of magnetic core memory element 10. The application of this pulse to the base of transistor 20 causes the collector voltage of transistor 20 to swing toward plus 5 volts and a current to flow through primary winding 27 of transformer 24, which in turn produces an excitation on the core of transformer 24 and a switching of the flux thereof. This switching flux causes a voltage (the polarity of which is in such a direction as to sustain the conduction of transistor 20) to be produced in feedback winding 26 of transformer 24. As soon as the voltage on winding 26 exceeds the trigger voltage magnitude at the base of transistor 20, diode 22 will begin to conduct and current will flow from the dot side of winding 26 through the emitter to the base of transistor 20 and back to the non-dot side of winding 26 through diode 22. This action quickly results in a voltage being produced on output winding 28. Diode 21 is placed in the blocking oscillator circuit to prevent current flow from feedback winding 26 to terminal 7 of magnetic core memory element 10; and diode 22 serves to prevent the trigger input signal from terminal 7 from being shunted by feedback winding 26 until the voltage developed across this winding produces enough current to assume control.

The collector current of transistor 20 continues to increase as time progresses and, depending upon the number turns of primary winding 27, the flux available and the magnitude of the voltage applied to the emitter of transistor 20, a delay time will be reached in which a further increase in collector current produces no further increase in flux. When this point is reached no further voltage is produced in feedback winding 26, and the collector current in transistor 20 drops to zero. This removes the excitation from the core of transformer 24 and the flux in the core begins to reverse direction. This reversal of flux direction causes an opposite polarity pulse to be produced on each of the windings on transformer 24 and thereby results in the overshoot voltage that is applied to amplifier 12 of FIGURE 1. The blocking oscillator circuit parameters are chosen so that there will be only one pulse generated by the blocking oscillator for each input trigger pulse or, in other words, the circuit is arranged to function as a one-shot and not a free-running blocking oscillator. The blocking oscillator, designed as just described, aside from providing a delayed pulse for the reset winding and an output pulse for a utilization circuit, also serves an important additional function of preventing noise pulses from the output winding of magnetic core memory element 10 from being presented to utilization circuit 17 when a read input pulse is applied to the read input winding of a disabled magnetic core memory element 10.

While separate windings have been shown for the application of the disable and read information, one winding can be used to perform both the disable and read functions, since both of these functions require the same polarity pulse. This can be accomplished by applying to the same winding an input pulse of small magnitude and long duration as a disable pulse and an input pulse of large magnitude and short duration as a read pulse. Also, instead of having a separate enable input winding on magnetic core memory element 10, the enable pulse could be applied to the input of amplifier 12. In addition, while the output signal is shown in the figures as being taken from the collector of transistor 20, an output signal of either polarity could instead be derived from any of the windings on blocking oscillator transformer 24. In fact, should it be desired, a multiplicity of outputs could be derived from blocking oscillator transformer 24.

Also, it might be well to note that it is possible to cascade one magnetic core memory element 10 with many more magnetic core memory elements so that one read, one disable, or one enable pulse signal can be arranged to control many magnetic core memory elements. In addition, if sufficient flux is generated in blocking oscillator transformer 24, of FIGURE 2, amplifier 21, of FIGURE 1, can be eliminated. Then the blocking oscillator overshoot voltage would be coupled through an isolating diode, back to reset terminal 6 of magnetic core memory element 10.

In an actual embodiment of the invention, a commercially available mo-permalloy non-linear toroidal magnetic core (Dynacor type 072S22A1) with a diameter of approximately 0.2 inch and a thickness of approximately 0.1 inch was used as the core for magnetic core memory element 10. As desired, this core exhibited a substantially rectangular hysteresis loop. All of the windings on this magnetic core were wound with number 40 American Wire Gauge (AWG) wire with the read, disable, enable, reset and output windings having 3, 10, 5, 55, and 6 turns, respectively.

In operation, the read pulse amplitude was adjusted to switch the core of magnetic core memory element 10 in approximately 0.5 micro-second. This switching time was chosen to permit good triggering of blocking oscillator 11 and, at the same time, to provide a trigger pulse no wider than necessary in order to obtain a large voltage per turn signal on output winding 7 of magnetic core memory element 10.

Since the core of the aforementioned magnetic core memory element 10, as designed, exhibited a maximum switching time of 20 microseconds, the disable pulse was chosen to have a magnitude sufficient to switch the core in 20 microseconds. With a disable pulse of this type applied to the disable winding 4 of magnetic core memory element 10, the pulse produced on output winding 7 was insufficient to trigger blocking oscillator 11. Therefore, by the proper choice of the disable pulse, false operation of magnetic core memory element circuit 9 was prevented.

Figure 3:
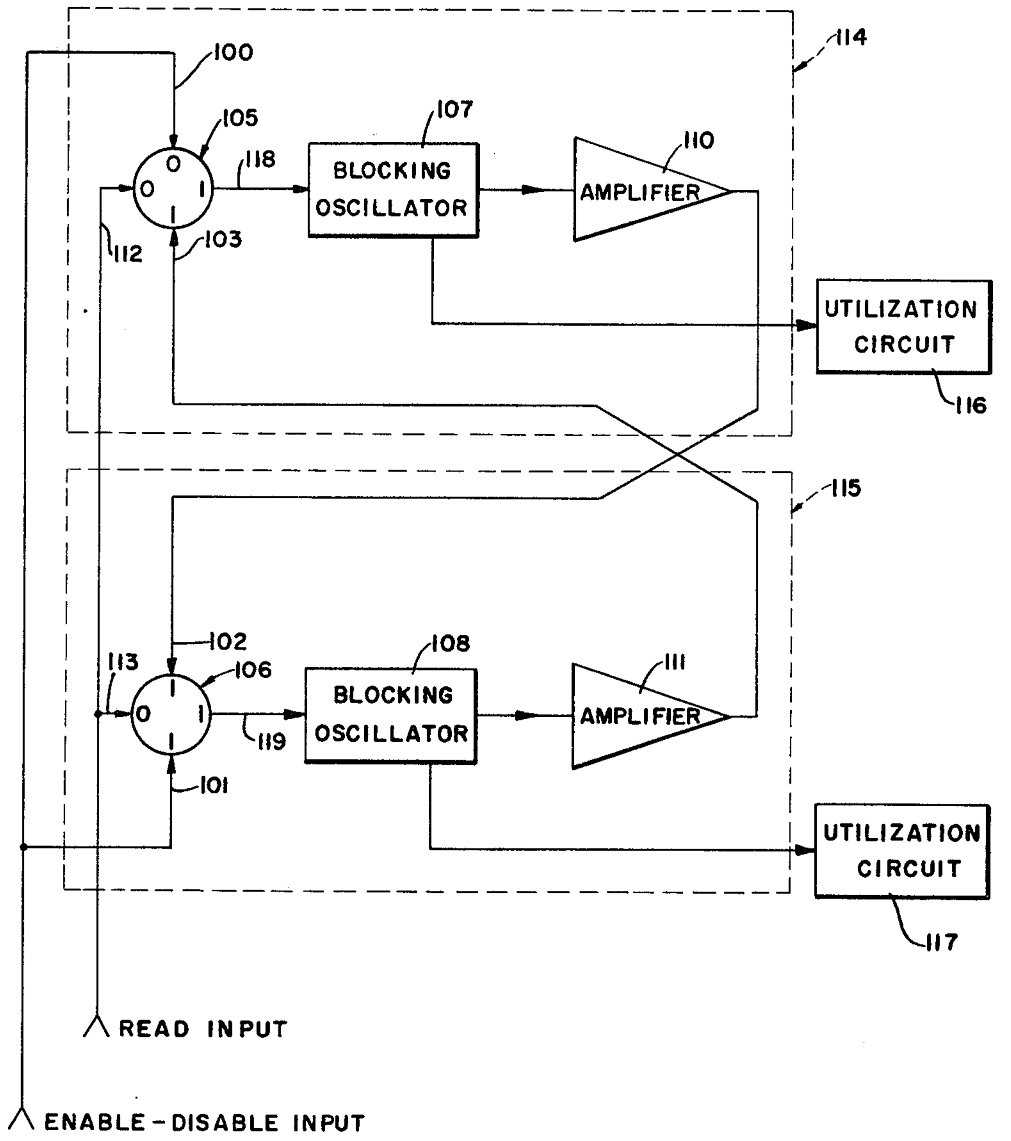
FIGURE 3 is a block diagram representation of a combination of two magnetic core memory element circuits, of the type as depicted in FIGURE 1, connected in such a way as to produce a pulse-type flip-flop circuit.

There is shown in FIGURE 3 two magnetic core memory element circuits, magnetic core memory circuits 114 and 115, arranged to function as a pulse-type flip-flop circuit. Magnetic core memory circuit 114 is substantially the same as that shown in FIGURE 1 with the exceptions that the magnetic core memory element has three input terminals instead of four—namely, disable terminal 100, read terminal 112 and reset terminal 103; and the output from amplifier 110 is connected to reset terminal 102 of magnetic core memory element 106 of magnetic core memory element circuit 115 instead of to reset terminal 103 of the magnetic core memory element 105. Output terminal 118 of magnetic core memory element 105 is connected to blocking oscillator 107 which is in turn connected to amplifier 110.

Magnetic core memory element circuit 115 also includes a magnetic core memory element 106 with three input terminals—namely, enable terminal 101, read terminal 113 and reset terminal 102. Output terminal 119 is connected to blocking oscillator 108 which is in turn connected to amplifier 111. The output from amplifier 111 is coupled back to reset terminal 103 of magnetic core memory element 105.

One input is used for the application of both the enable and disable pulse to terminal 101 and terminal 100, respectively, and the outputs from blocking oscillators 107 and 108 are applied to utilization circuits 116 and 117 respectively. It is to be noted that the read pulse is applied simultaneously to read terminals 112 and 113 and that the enable and disable pulses are applied simultaneously to enable and disable terminal 100 and 101.

With the flip-flop circuit of FIGURE 3, arranged as just described, and with a pulse applied to both the enable and disable terminals 100 and 101 followed by read pulses applied to read terminals 112 and 113, in the proper time sequence, pulses are passed back and forth between magnetic core memory element circuits 114 and 115. Accordingly, a pulse is applied to utilization device 117 for every other read input pulse applied to the read input terminals and to utilization device 116 for every other alternate read input pulse applied to the read input terminals.

The requirements placed on the input pulses applied to magnetic core memory element circuits 114 and 115 are essentially the same as those for the single magnetic core memory element circuit of FIGURE 1 with the exception that it is not necessary for a disable pulse, applied to input terminal 100, to switch magnetic core memory element 105 over a long period, as required for a single-magnetic core memory element. This may be explained by referring to FIGURE 3 and noting that if blocking oscillator 107 is triggered by the application of a pulse to input 100 of magnetic core memory element 105, the resulting output from amplifier 110, connected to reset input 102 of magnetic core memory element 106, will only provide an additional input to magnetic core memory element 106 which is of the same phase as the input that was applied to input 101 of magnetic core memory element 106 at the same time that the disable pulse was applied to input 100 of magnetic core element 105. Thus, the desired result of requiring magnetic core memory element 105 to be disabled and magnetic core memory element 106 to be enabled has been achieved whether or not blocking oscillator 107 was triggered by the application of an enable-disable pulse.

The subsequent application of a read pulse to read input terminals 113 and 112 will cause magnetic core memory element 106 to be disabled and magnetic core memory 105 to be enabled, respectively, and an output pulse to be applied from blocking oscillator 108 to utilization device 117. The next read pulse applied to the two read input terminals will cause magnetic core memory element 105 to be disabled and magnetic core memory element 106 to be enabled, and an output pulse to be applied from blocking oscillator 107 to utilization device 116. This cycle will be repeated with each pair of read pulses applied to the read input terminals.

What is claimed is:

1. A magnetic core memory element circuit capable of producing an output signal without loss of the stored information comprising a magnetic core memory element including a core member having a first and a second state and a plurality of windings, including an output winding and a reset winding, wound on said core member; and a blocking oscillator connected between said output winding and said reset winding to furnish said output signal and to automatically reset said magnetic core memory element to its original state by application of a signal to said reset winding.

2. The circuit of claim 1 further including an amplifier and a utilization device; and wherein said blocking oscillator is in series with said amplifier and connected between said output winding and the input of said amplifier; wherein the output of said amplifier is applied to said reset winding; and wherein said utilization device is connected to said blocking oscillator to receive said output signal therefrom.

3. A pulse-type flip-flop circuit comprising a first and a second magnetic core memory element circuit, each including a delay means and a two state magnetic core memory element having a core member and a plurality of windings wound on said core member; said delay means of said first magnetic core memory element circuit connected between one of said plurality of windings of said magnetic core memory element of said first magnetic core memory element circuit and one of said plurality of windings of said magnetic core memory element of said second magnetic core memory element circuit; and said delay means of said second magnetic core memory element circuit connected between another of said plurality of windings of said magnetic core memory element of said second magnetic core memory element circuit and another of said plurality of windings of said magnetic core memory element of said first magnetic core memory element circuit.

4. The flip-flop circuit of claim 3 wherein each of said plurality of windings includes an output winding, and wherein said delay means of said first magnetic core memory element circuit is connected between said output winding of said magnetic core memory element of said first magnetic core memory element circuit and one of said windings of said magnetic core memory element of said second magnetic core memory element circuit, and said delay means of said second magnetic core memory element circuit is connected between said output winding of said magnetic core memory element of said second magnetic core memory element circuit and one of said windings of said magnetic core memory element of said first magnetic core memory element circuit.

5. The flip-flop circuit of claim 4 wherein each of said delay means includes a blocking oscillator connected in series with an amplifier; and which further comprises a first and a second utiiization circuit, said first utilization circuit being connected to said blocking oscillator of said first magnetic core memory element circuit and said second utilization circuit being connected to said blocking oscillator of said second magnetic core memory element circuit.

6. The flip-flop circuit of claim 5 wherein said plurality of windings of said magnetic core memory element of said first magnetic core memory element circuit includes a disable winding, a read winding, a reset winding and an output winding and wherein said plurality of windings of said magnetic core memory element of said second magnetic core memory element circuit includes an enable winding, a read winding a reset winding and an output winding.

7. The flip-flop circuit of claim 6 wherein said disable winding and said enable winding are interconnected to have a common input signal applied thereto, and said read winding of said first magnetic core memory element circuit is interconnected with said read winding of said second magnetic core memory element circuit so that a single read input signal can be applied thereto; and wherein said series connected blocking oscillator and amplifier of said first magnetic core memory element circuit are connected between said output winding of said first magnetic core memory element circuit and said reset winding of said second magnetic core memory element circuit, and said series connected blocking oscillator and amplifier of said second magnetic core memory element circuit are connected between said output winding of said second magnetic core memory element circuit and said reset winding of said first magnetic core memory element circuit.

References Cited

UNITED STATES PATENTS

| | | | |
|---|---|---|---|
| 3,077,543 | 2/1963 | Irons | 340—174 X |
| 3,376,563 | 4/1968 | Korkowski | 340—174 |
| 2,591,406 | 4/1952 | Carter et al. | 340—174 |
| 3,015,808 | 1/1962 | De Troye | 340—174 |
| 3,074,052 | 1/1963 | Bunt | 340—174 |
| 3,200,382 | 8/1965 | Busch | 340—174 |
| 3,210,744 | 10/1965 | Gouttebel | 340—174 |
| 3,329,827 | 7/1967 | Kihn et al. | 307—88 |

BERNARD KONICK, Primary Examiner

K. E. KROSIN, Assistant Examiner

U.S. Cl. X.R.

307—88, 275; 331—112